(12) United States Patent
Helmick et al.

(10) Patent No.: US 6,560,061 B2
(45) Date of Patent: May 6, 2003

(54) HIGH DENSITY TAPE LIBRARY SYSTEM

(75) Inventors: Mark H. Helmick, Ventura, CA (US); William J. Lurie, Thousand Oaks, CA (US)

(73) Assignee: Qualstar Corporation, Canoga Park, CA (US)

( * ) Notice: Subject to any disclaimer, the term of this patent is extended or adjusted under 35 U.S.C. 154(b) by 0 days.

(21) Appl. No.: 09/754,516

(22) Filed: Jan. 4, 2001

(65) Prior Publication Data

US 2002/0085307 A1 Jul. 4, 2002

(51) Int. Cl.$^7$ .......................... G11B 15/68; G11B 17/22
(52) U.S. Cl. ...................... 360/92; 369/178.01
(58) Field of Search .............................. 360/92, 91, 71, 360/94; 369/30.41, 30.42, 30.49, 30.39, 36, 71.5, 72.5, 178, 177, 178.01

(56) References Cited

U.S. PATENT DOCUMENTS

| 3,149,529 A | | 9/1964 | Critchlow |
|---|---|---|---|
| 3,505,661 A | | 4/1970 | Gabor ...................... 340/174.1 |
| 3,848,264 A | | 11/1974 | Wilson ........................ 360/92 |
| 3,898,692 A | | 8/1975 | Teruuchi et al. ............. 360/69 |
| 3,996,616 A | * | 12/1976 | Sturrock et al. ............. 360/92 |
| 4,071,857 A | * | 1/1978 | Whitney et al. ............. 360/92 |
| 4,742,405 A | | 5/1988 | Teranishi ..................... 360/92 |
| 4,772,968 A | | 9/1988 | Nonaka et al. ............... 360/92 |
| 5,025,338 A | | 6/1991 | Sone et al. ............. 360/99.06 |
| 5,144,506 A | * | 9/1992 | Sahota ......................... 360/92 |
| 5,157,564 A | * | 10/1992 | Theobald et al. ............. 360/92 |
| 5,235,474 A | | 8/1993 | Searle ......................... 360/71 |
| 5,345,350 A | | 9/1994 | Ellis et al. .................... 360/92 |
| 5,537,268 A | * | 7/1996 | Felde et al. ................... 360/92 |
| 5,663,938 A | | 9/1997 | Dang et al. ................... 369/36 |
| 5,684,654 A | | 11/1997 | Searle et al. ................. 360/92 |
| 5,691,859 A | * | 11/1997 | Ulrich et al. ................. 360/92 |
| 5,718,339 A | | 2/1998 | Woodruff ................ 211/41.12 |
| 5,760,995 A | | 6/1998 | Heller ......................... 360/92 |
| 5,777,819 A | * | 7/1998 | Tanaka ........................ 360/92 |
| 5,936,795 A | * | 8/1999 | Theobald et al. ............. 360/92 |
| 5,940,354 A | | 8/1999 | Inoue .......................... 369/35 |
| 5,995,320 A | | 11/1999 | Ostwald ...................... 360/92 |
| 5,996,741 A | | 12/1999 | Jones et al. ................. 187/250 |
| 6,038,099 A | * | 3/2000 | Heinze et al. ................ 360/92 |
| 6,097,566 A | * | 8/2000 | Heller et al. ................. 360/92 |
| 6,130,800 A | * | 10/2000 | Ostwald ...................... 360/92 |
| 6,160,678 A | * | 12/2000 | Meikle et al. ................ 360/92 |

* cited by examiner

Primary Examiner—Hoa T. Nguyen
Assistant Examiner—Dzung C. Nguyen
(74) Attorney, Agent, or Firm—Oppenheimer Wolff & Donnelly LLP

(57) ABSTRACT

A high density tape library includes a plurality of rectangular platforms mounted adjacent one another for movement in a plane, with tape cassette magazines mounted on the platforms. The platforms have depending guide and cam follower members for movement around a generally rectangular track under the control of a series of cams. At a cassette handling station, selected tape cassettes are shifted from a magazine to a tape drive.

25 Claims, 6 Drawing Sheets

HIGH DENSITY TAPE LIBRARY SYSTEM

BACKGROUND OF THE INVENTION

1. Field of the Invention

This invention relates to tape storage systems and, more specifically, to such systems which are suitable for rack mounting.

2. General Background and State of the Art

Tape libraries are known in the field as indicated by U.S. Pat. No. 5,498,116, granted Mar. 12, 1996, and as disclosed in U.S. patent application Ser. No. 08/427,884, filed Apr. 26, 1995, which is matured into U.S. Pat. No. 6,271,982 and assigned to the assignee of this invention. In these systems, a large number of tape cassettes or cartridges are stored in tower-like configurations, and transfer mechanisms are provided for selecting designated tape cassettes and transporting them to a tape drive where data may be accessed from the tape cassettes or written into the tape cassette or cartridge.

One disadvantage of these known prior art arrangements is that they take up more space than is desirable. Thus, for example, standard electronic racks for mounting electronic equipment are normally 19 inches wide and have vertical spaces for storing electronic equipment in, in terms of standard increments or units of height equal to one and three quarters (1¾) inches. Electronic equipment intended for rack mounting is normally designed to occupy a predetermined number of units of height, such as one unit of height (1¾ inches) or two or three units of height (3½ inches or 5¼ inches, respectively).

If the prior art tape library systems as identified above were to be mounted in standard electronic racks, they would occupy a large number of rack units of height, and this would be considered very wasteful of available rack space.

Another factor to be considered is that prior art tape library systems are often designed to accommodate only one type of cassette, for example an 8 mm tape cassette or one of the ½-inch wide tape cassettes; and each system must be uniquely designed to handle the specific type of cassette.

SUMMARY OF THE INVENTION

Accordingly, one object of the invention is to provide a more compact tape library system which will accommodate a large number of cassettes, and only occupy a few rack units of space.

Another object of the invention is to provide a tape library design in which there is a high degree of commonality in the parts which are included in systems for handling different types of tape cassettes.

In accordance with one illustrative embodiment of the invention, the foregoing objects are achieved in a tape library system which includes an array of rectangular platforms, with the platforms being mounted adjacent one another for movement in a plane. Cassette magazines are mounted on the platforms. A cassette handling station is provided immediately adjacent the platforms, and a mechanism is provided for shifting the position of the platforms to bring selected magazines to the cassette handling station. Each system is provided with one or more tape drives, and a transfer carriage for gripping a selected cassette and transferring it to the drive or drives.

In a preferred embodiment, a track is provided and each of the platforms has a depending guide for riding in the track and a cam follower for engagement by a plurality of cams underlying the track.

In a preferred embodiment, the number of platforms is one less than the number of platform stations for maximum cassette density. Four cams may be provided with two at each end of the system with axes of rotation of the cams at each end being displaced from each other. The shifting of platforms is a four-step process, with one cam acting on a single platform at each point in the cycle to apply force to one platform to move that platform (and any aligned platforms) toward the vacant station. Each cam has an extent of 90 degrees and may be operated in a forward or reverse direction to move the magazines in one direction or the other. The reversible capability reduces cassette access time, as the system can act in either direction to bring the selected cassette to the cassette handling station through the shortest path.

In considering the system from an overall standpoint, it may be noted that the vacant station "moves" in the opposite direction from the direction of rotation of the cams and the platforms.

This preferred system as described above has the advantages of both (1) high density because only one station is vacant or open, and (2) reversibility for rapid cassette access.

By substituting different magazines mounted on said platforms, different types of cassettes may be accommodated, while still using the same platform, track and camming arrangements for systems handling different types of cassettes.

In accordance with additional features of the system (1) a number of platform locations may be provided with the number of platforms being one less than the number of platform locations; and (2) the cassette magazines may be facing the cassette handling station as the platforms are shifted in position; (3) the tape drives may be positioned so that the cassettes may be transferred linearly without changing orientation of the cassettes; and (4) with modified optimum platform sizes for each type of cassette, significant commonality of parts and design features may be present in the different systems.

It is also noted in passing that the platforms and platform locations do not have to be immediately adjacent one another, but could be in an open-center rectangular configuration, for example. With arrangements of this type, additional system equipment such as the drive motor and electronics may be located in the open center of the platforms.

Concerning commercially available tape libraries, in the ½-inch tape drive category, one commercially available library system with two drives includes 18 tape cassettes in a five rack-unit space. This compares with the design in accordance with the invention which would include 21 cassettes and two drives in a five rack-unit space. This is an increase in system capacity of about 16%.

In the 8 mm tape drive field, there is one commercially available five rack-unit system which only has 30 cassettes, and the comparable system made in accordance with the invention has a 65 cassette capacity. This design would include 13 platforms with five cassettes in each magazine on each platform. This would involve an increased system capacity of substantially more than 100%.

Other objects, features and advantages of the invention will become apparent from a consideration of the following detailed description and the accompanying drawings.

BRIEF DESCRIPTION OF THE DRAWINGS

FIG. 4 is an exploded view of the platform movement system of FIG. 3;

DETAILED DESCRIPTION OF THE PREFERRED EMBODIMENTS

Figure 1:
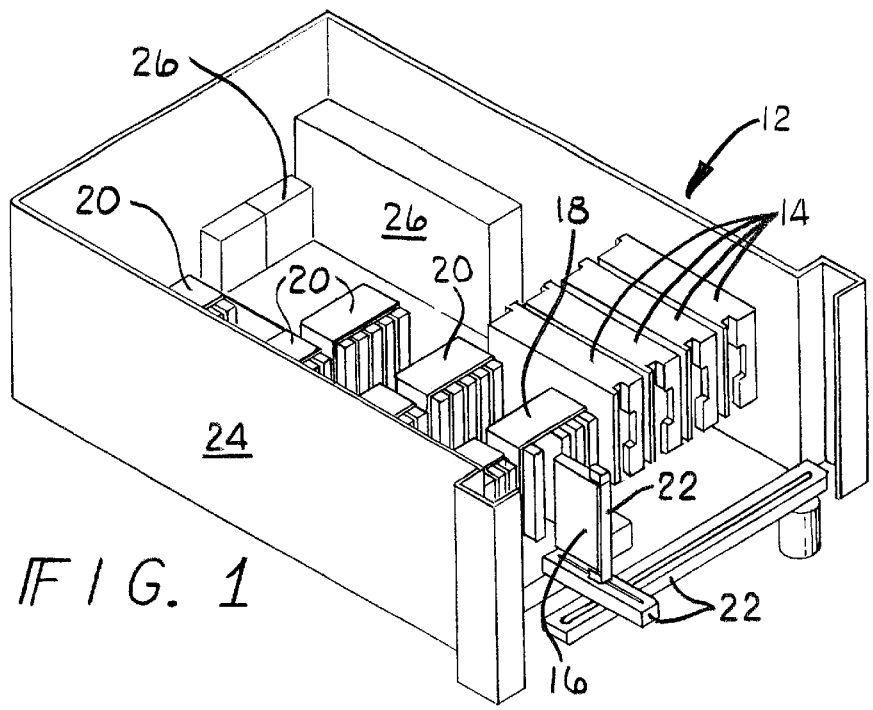
FIG. 1 is a diagrammatic perspective view of a high density tape library system illustrating the principles of the invention, and using 8 mm tape cassettes.

Referring now to FIG. 1 of the drawings, the overall tape library system 12 includes several tape drives 14 for reading and writing information onto cassettes such as the cassette 16 which has been removed from the magazine 18 which still has four additional cassettes mounted therein. Six additional magazines for holding cassettes designated by the reference numeral 20 are mounted on platforms which are not shown in detail in FIG. 1. The magazine 18 is located at the cassette handling station of the system so that the cassette 16 may be removed from the magazine 18 by the mechanism 22 which is shown schematically, and which removes the cassette 16 from the magazine 18 and shifts it along the track as shown in FIG. 1 for loading into one of the tape drives 14. It may be noted that the configuration of the system, including the orientation and location of the magazines and the drives, is such that a linear transfer of cassettes from the loading station or loading stations may be accomplished without changing the orientation of the cassettes.

Also included within the housing 24 are additional components 26 which may include power supply, electronics, a drive motor, and collateral equipment.

Figure 2:
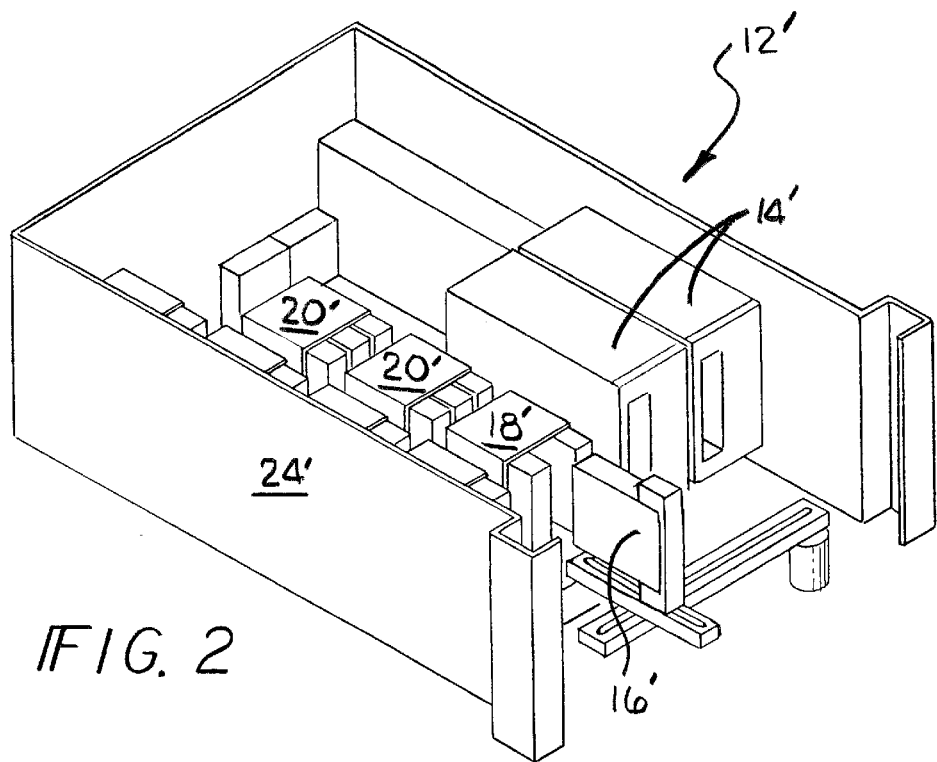
FIG. 2 is a showing similar to that of FIG. 1, but using ½-inch tape cassettes.

FIG. 2 shows a system 12' which is quite similar to the system of FIG. 1 but is intended for handling ½-inch width tapes as indicated by the larger cassette 16' which is shown being transferred from the magazine 18' to one of the two tape drives 14'. In general, the system of FIG. 2 operates in a manner similar to that of FIG. 1, as will be discussed in greater detail hereinbelow.

Figure 3:
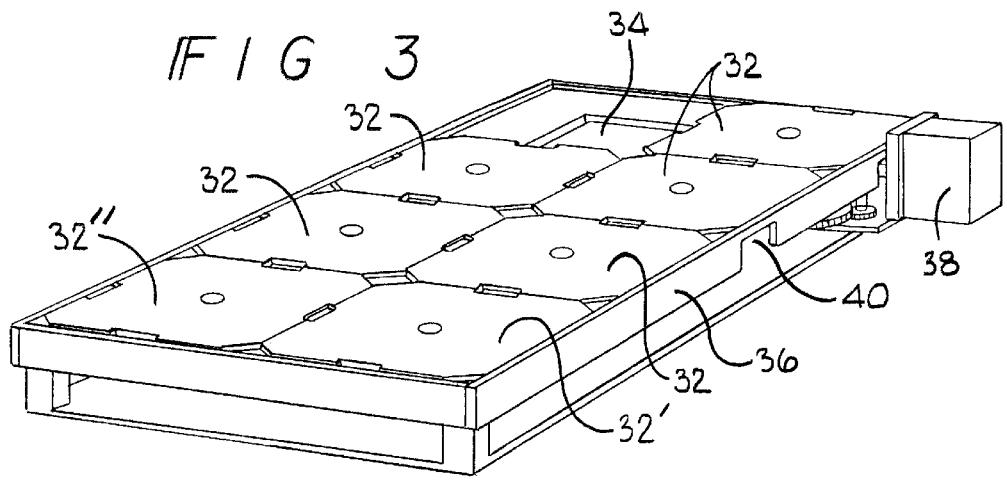
FIG. 3 is an exterior view of the system for moving the platforms upon which the magazines for the tape cassettes are mounted.

FIG. 3 is an external view of the sub-assembly which carries the platforms 32 upon which the magazines 20 and 20' of FIGS. 1 and 2 are mounted. The particular embodiment of the invention shown in FIG. 3 has eight platform stations, with one platform station 34 being vacant. In addition, it is noted that the particular platform 32' is located at the tape handling station where the loading and unloading mechanism 22, as shown in FIG. 1, accesses specific cassettes and shifts them between the magazines and the tape drives. In accordance with system requirements, one or more additional tape handling stations may be provided, as indicated at platform 32" in FIG. 3. Also shown in FIG. 3 are the frame members 36 and the motor 38 which drives the mechanism which shifts the positions of the platforms 32. It may be noted in passing that the frame has a central recess 40 representing an alternative mounting position for the motor 38.

FIG. 4 shows an exploded view of the platform shifting mechanism of FIG. 3. More specifically, the system of FIG. 4 includes the plate 44 which has a slot 46 therein in which the guide members 48 slide and/or are guided. The movement of the platform 32 is controlled by the cams 52, 54, 56 and 58. As will be described in greater detail hereinbelow, the movement of the platforms is a four-step process in which the open platform station 34 is initially filled by one of the adjacent platforms, and then the remainder of the platforms are shifted around.

Figure 5:
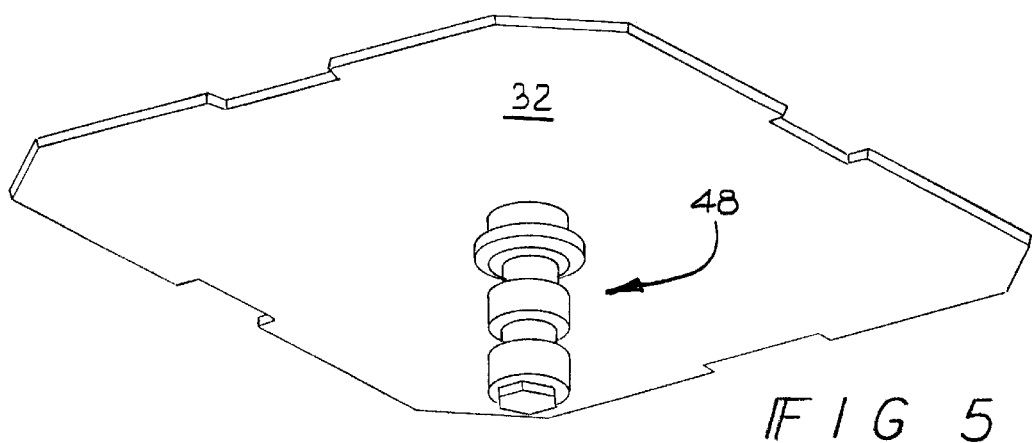
FIG. 5 is an enlarged view from the bottom of one of the platforms shown in FIGS. 3 and 4, with the depending guide and cam follower attached to the center of the platform.

With regard to other components shown in FIG. 4, the motor 38 drives various gears 62 which control the rotation of the cams. Incidentally, the entire gear train and all four cams move synchronously, with each of the four cams 52, 54, 56 and 58 being operable to engage their respective cam followers only for one-quarter of the operating cycle of the system. It is further noted in passing that there are two cams 52 and 54 at one end of the system, and two cams 56 and 58 at the other end of the system, and that they are located at different elevations of the system to engage different ones of the cam follower surfaces shown in the depending member 48 of each of the platforms 32, as best shown in FIG. 5 of the drawings. The cams 52 and 54 also have slightly offset axes of rotation to implement the platform movement sequence as described hereinbelow.

Figure 6:
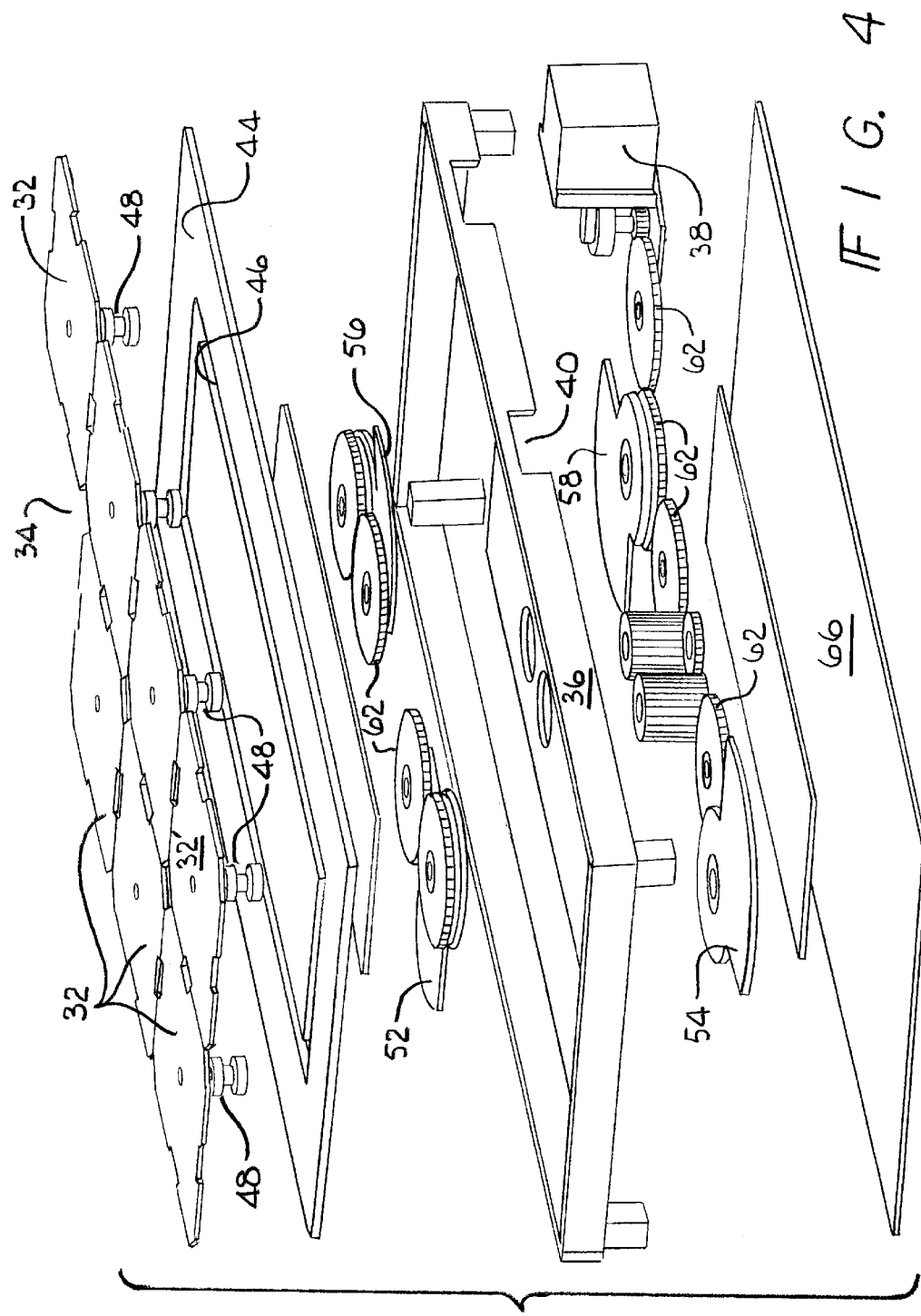
FIG. 6 is a bottom view of the platform moving system of FIGS. 3 and 4.

Referring now to FIG. 6 of the drawings, it shows the mechanism from another perspective, specifically from the bottom of the unit with the lower-most plate 66 of FIG. 4 being removed.

Figure 7:
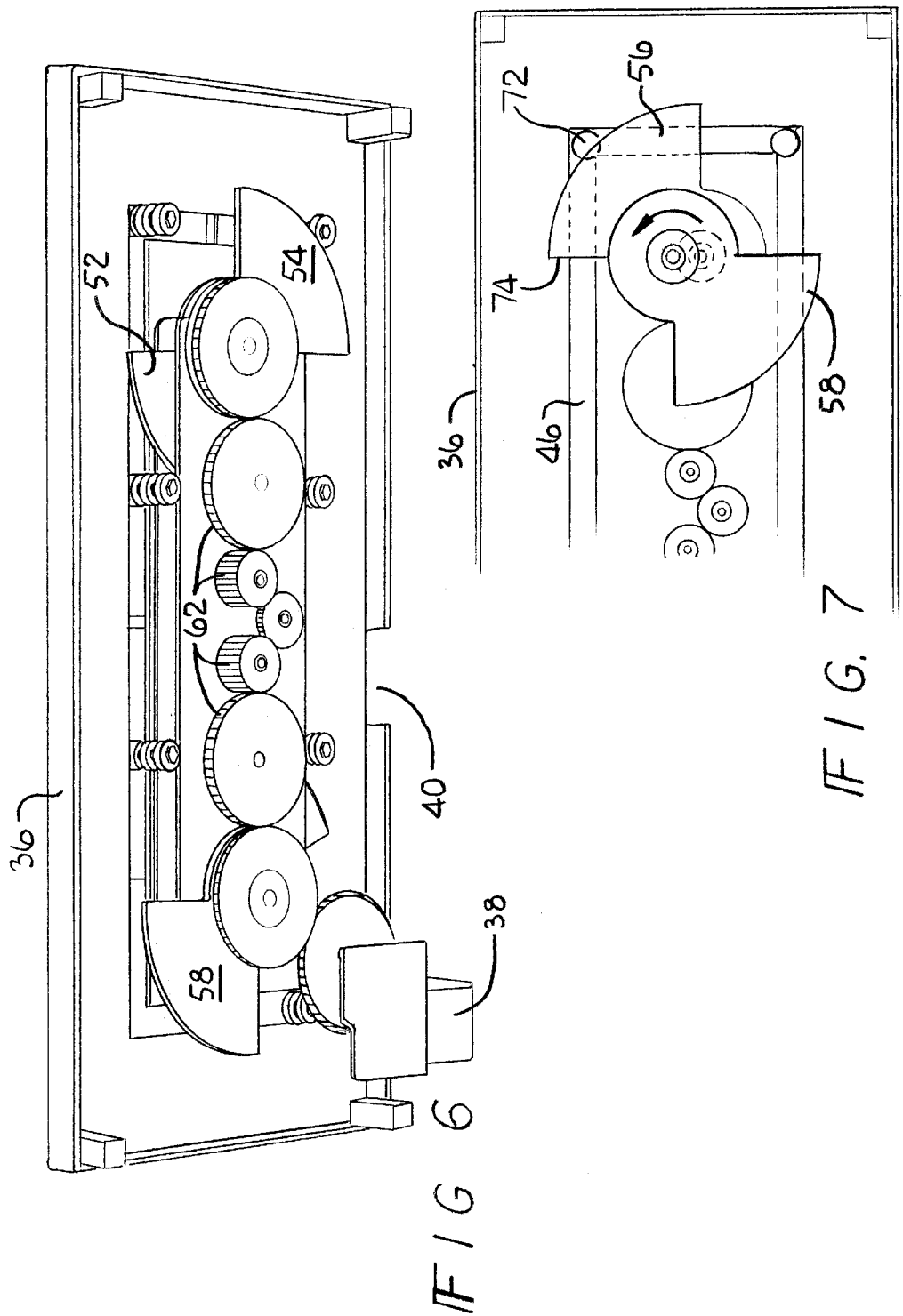
FIG. 7 is an additional view of one end of the system as shown in FIG. 6 taken directly into the system and perpendicular to the plane thereof.

FIG. 7 is a fragmentary bottom view showing the cams 56 and 58 along with the tracks along which the guide members depending from the platforms ride. In FIG. 7, the circle 72 represents one of the guide members depending from each of the platforms. As shown in FIG. 7, the front surface 74 of the cam member 56 has engaged the guide member indicated at 72 and has shifted it from the point designated 76 over to the position 72, at the corner of the track 46. This is one of the steps accomplished by the four cams 52, 54, 56 and 58, as shown in FIG. 4 of the drawings, for example.

Figure 8:
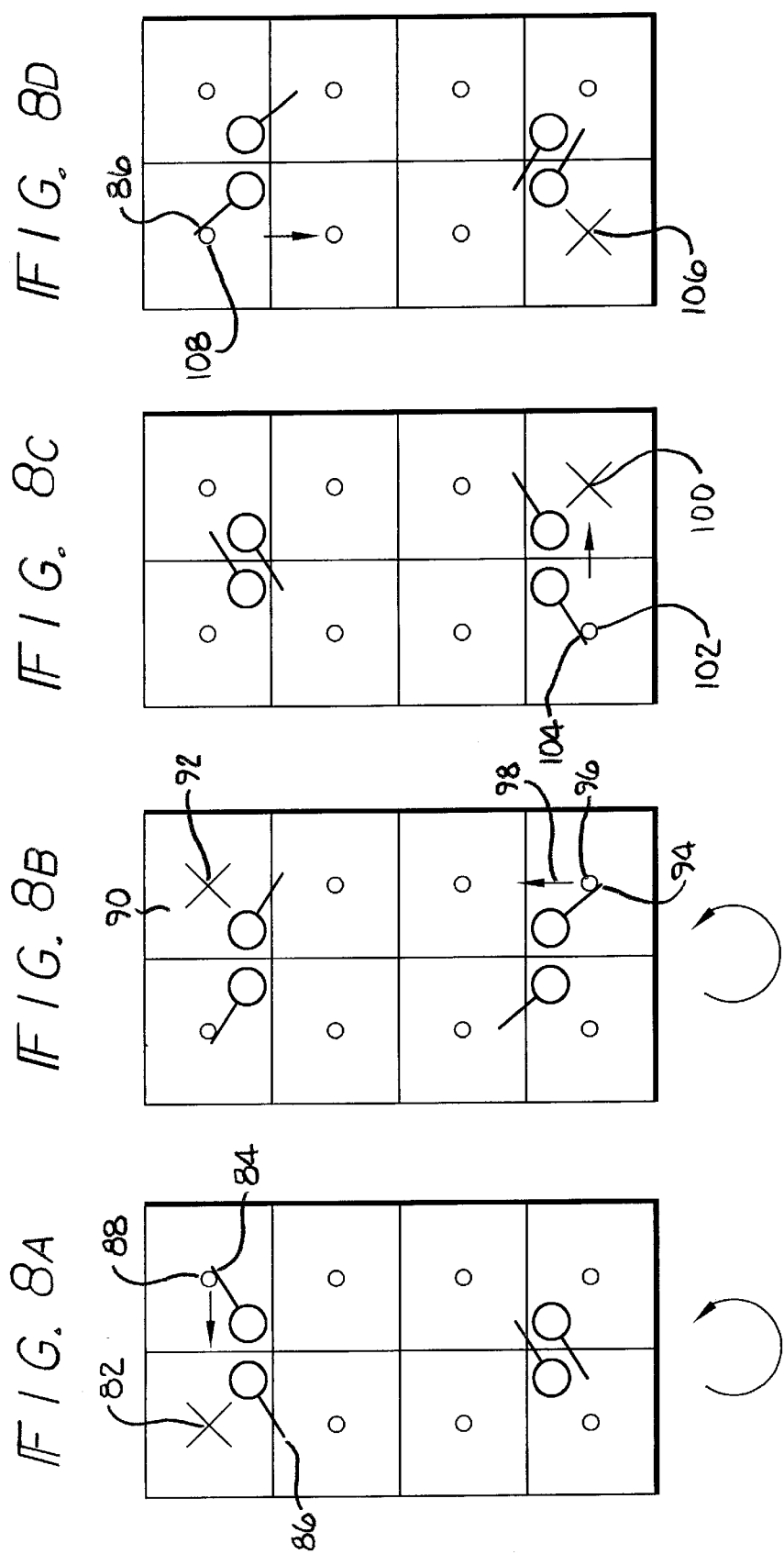
FIGS. 8A through 8D are diagrams illustrating the mode of operation of the system of FIGS. 3 through 7.

The four steps involved in shifting the platforms around the rectangular configuration of platform stations will now be described in some detail in connection with FIGS. 8A, 8B, 8C, and 8D. In these figures, the vacant platform station will be indicated by an "X" as shown at reference numeral 82 in FIG. 8A. The cams and the leading edges thereof, such as edge 74 of cam 56, are shown by the lines 84 and 86, for example, with line 84 representing the front surface 74 of cam 56, and the line 86 representing the front surface of the cam 58. In FIG. 8A, the platform having the depending guide and cam follower member 88 is engaged by the cam 84 and is moved over to fill the vacant space indicated by the "X" 82. At that point, the guide and cam follower is shifted to the position indicated at 72 in FIG. 7, at the corner of the track 46.

Following the step indicated in FIG. 8A of the drawings, the platform station 90 is vacant, as indicated by the "X" 92. It is then desirable to shift the three lower right-hand platforms upward so that the open space 90 is filled. This is accomplished by the cam face 94 which engages the depending guide member 96 and shifts all three right-hand platforms upwardly as indicated by the arrow 98. FIG. 8C presents the situation following the step of FIG. 8B, which left the lower right-hand station vacant as indicated by the "X" designated by the reference numeral 100. The next step is the engagement of the depending guide member 102 by the front surface of a cam indicated by reference numeral 104. This shifts the lower left-hand platform transversely into the vacant space at the lower right-hand side of the diagram of FIG. 8C. As indicated by the arrow 105, FIG. 8D represents the situation following the step shown in FIG. 8C, and the open platform station at the lower left-hand corner of diagram 8D is indicated by the reference numeral 106. The front surface of one of the cams indicated by reference numeral 86 now engages the depending guide member 108, and shifts the three right-hand platforms downwardly toward the vacant space indicated by the reference numeral 106, thus completing the four-step movement of the cycle needed to shift the magazines around the eight-station configuration.

Incidentally, it is again noted that the cams 56 and 58 are not concentrically mounted, but that their pivot points are displaced somewhat to ensure engagement of the cams at the desired intervals to accomplish the necessary shifting functions. It can also be seen in the diagrams of FIGS. 8A through 8D.

Figure 9:
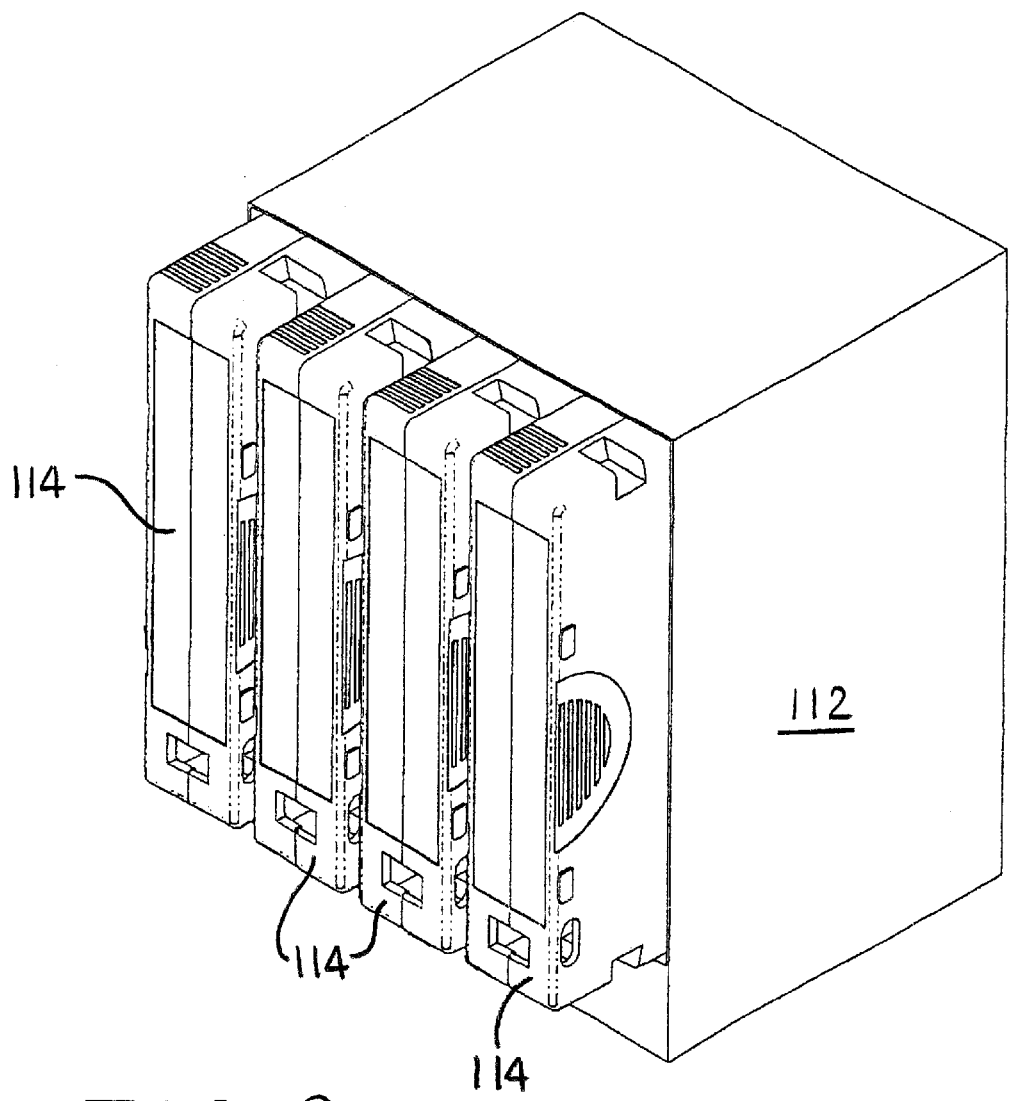
FIG. 9 is a perspective view of a magazine in which a plurality of cassettes are mounted.

For completeness, FIG. 9 has been added to show a typical magazine 112 in which a plurality of cassettes 114 are shown mounted. In the implementation of the system as shown in FIGS. 1 and 2, for example, the upper and lower front corners of the cassettes are gripped and the cassettes are thereafter withdrawn from the individual magazines, and transferred to the tape drives.

For completeness, it is noted that the dimensions of one system illustrating the principles of the invention involved a height of 5 rack units, or 8-¾ inches, a width of about 16.6 inches, and a depth of about 26 inches.

In the foregoing detailed description, one preferred illustrative embodiment of the invention has been described. In the described system, only one of the platform stations is left vacant, with all the other platform stations being filled with platforms. This makes for a high density of cassettes. In addition, the system is reversible which, of course, reduces access time to obtain any selected cassette. Other designs accomplishing much the same purpose can be implemented with some of them having various shortcomings. As one example, it is quite possible to have a design with two vacant stations, in which a simple straight lever-acting mechanism may be employed to shift the platforms and with a simpler motion. In addition, a unidirectional system may be employed in which the depending guide members are engaged by a two-part lever, with the outer portion of the lever being pivotal in only one direction. This type of simpler mechanism is unidirectional and only needs to have one vacant station so it has some of the advantages of applicant's preferred design. A multiple electromagnetic plunger actuation of the movement of the platforms represents another alternative which may be employed. It is further noted that, instead of separate cassette magazines and platforms, the bottom of each of the cassette magazines could also serve as the platform. Accordingly, the present invention is not limited to the specific preferred illustrative embodiment disclosed in the drawings and described in detail hereinabove.

We claim:

1. A high density tape library system comprising:
   a plurality of at least three substantially rectangular platforms; said platforms being mounted adjacent to one another for movement in a plane along a closed path around which said platforms are circulated;
   a plurality of cassette magazines mounted respectively on said platforms, each said cassette magazine including discrete spaces for receiving a plurality of cassettes;
   said system including a cassette handling station adjacent to said platforms;
   a mechanism for shifting the position of said platforms along said path without changing the angular orientation thereof to bring any selected one of said cassette magazines to said cassette handling station; and
   said cassette magazines being oriented to face said cassette handling station;
   whereby any selected cassette is accessed by shifting the position of said platforms until the cassette magazine containing said selected cassette is located at said cassette handling station.

2. A system as defined in claim 1 further comprising a depending guide and cam follower on each platform, a track for engagement by said guide and cam follower, and a plurality of cams for shifting said platforms along said track.

3. A system as defined in claim 2 including four cams operative successively to provide a four-step platform shifting cycle.

4. A system as defined in claim 2 wherein two of said cams overlap one another, and said two cams have offset axes of rotation.

5. A system as defined in claim 1 wherein said system includes a plurality of discreet platform locations, and wherein there is one less platform than platform locations.

6. A system as defined in claim 1 further comprising at least one tape drive, and a transfer mechanism including a cassette gripper and a carriage for transferring selected cassettes from a magazine at said cassette handling station to said tape drive.

7. A system as defined in claim 1 wherein said system includes mechanical arrangements for providing a predetermined plurality of platform stations, and wherein there is one less platform than platform stations, so that there is always one vacant platform station.

8. A high density tape library system as defined in claim 1 wherein said closed path is substantially rectangular.

9. A family of high density tape library systems comprising:
   a first and second tape library system, each comprising:
      a. a plurality of rectangular platforms; said platforms being mounted adjacent to one another for movement in a plane along a closed path around which said platforms are circulated;
      b. a plurality of cassette magazines mounted respectively on said platforms; each said cassette magazine including discrete spaces for receiving a plurality of cassettes;
      c. said system including a cassette handling station immediately adjacent to said platforms;
      d. a mechanism for shifting the position of said platforms along said path without changing the angular orientation thereof;
      e. said cassette magazines being oriented to face said cassette handling station;
      f. whereby any selected cassette is accessed by shifting the position of said platforms until the cassette magazine containing said selected cassette is located at said cassette handling station;
   said first and second systems having substantially the same platforms and platform shifting mechanisms, but having different magazines having correspondingly different tape cassette capacities.

10. A system as defined in claim 9 wherein said first system has magazines with 8 mm tape cassettes mounted in said magazines; and said second system has magazines with ½-inch tape cassettes mounted therein.

11. A system as defined in claim 10 further comprising at least one tape drive, and a transfer mechanism including a cassette gripper and a carriage for transferring selected cassettes from a magazine at said cassette handling station to said tape drive.

12. A system as defined in claim 11 wherein said tape drive is aligned with said magazines, and said carriage transfers said cassettes linearly between said magazines and said drive without changing the orientation of said cassettes.

13. A system as defined in claim 10 wherein said system includes mechanical arrangements for providing a predetermined plurality of platform stations, and wherein there are one less platforms than platform stations, so that there is always one vacant platform station.

14. A high density tape library system as defined in claim 9 wherein said closed path is substantially rectangular.

15. A high density tape library system comprising:
- a plurality of substantially rectangular platforms; said platforms being mounted for movement in a plane; along a closed path around which said platforms are circulated;
- a plurality of cassette magazines mounted respectively on said platforms; each said cassette magazine including discrete spaces for receiving a plurality of cassettes;
- said system including at least one cassette handling station adjacent to said platforms;
- a mechanism for shifting the position of said platforms to bring said cassette magazines successively to said cassette handling station; to bring any selected one of said cassette magazines to said cassette handling station;
- whereby any selected cassette is accessed by shifting the position of said platforms until the cassette magazine containing said selected cassette is located at said cassette handling station.

16. A system as defined in claim 15 further comprising a depending guide and cam follower on each platform, a track for engagement by said guide and cam follower, and a plurality of cams for shifting said platforms along said track.

17. A system as defined in claim 15 further comprising a plurality of cassettes mounted into said cassette magazines.

18. A system as defined in claim 15 wherein said system includes a plurality of discreet platform locations, and wherein the number of platforms is one less than the number of platform locations.

19. A high density tape library system as defined in claim 15 wherein said closed path is substantially rectangular.

20. A high density tape library system as defined in claim 15 wherein said system includes at least four platform stations, and wherein the number of platform stations is at least one more than the number of platforms.

21. A high density tape library system as defined in claim 15 wherein said system includes at least four platform stations, and wherein the number of platform stations is at least two more than the number of platforms.

22. A high density tape library system comprising:
- a plurality of at least three substantially rectangular platforms; said platforms being mounted adjacent to one another for movement in a plane;
- a plurality of cassette magazines mounted respectively on said platforms; each said magazine including discrete spaces for receiving a plurality of cassettes;
- a track providing a substantially closed loop path for guiding movement of said cassette magazines around said closed loop path;
- said system including at least four platform stations spaced around said track, one of which is a cassette handling station;
- a mechanism for shifting the position of said platforms around said track without changing the angular orientation thereof; and
- said cassette magazines being oriented to face said cassette handling station;
- at least one tape drive; and
- said cassette handling station including mechanical arrangements for removing a selected one of said cassettes from a cassette magazine at said cassette handling station and transferring said selected cassette to said tape drive;
- whereby any selected cassette may be accessed by shifting the position of said platforms until the cassette magazine containing said selected cassette is located at said cassette handling station.

23. A high density tape library system as defined in claim 22 wherein said closed path is substantially rectangular.

24. A high density tape storage and access system comprising:
- a plurality of at least three tape cassette magazines;
- a framework and mechanism providing a plurality of at least four magazine stations, including at least one cassette handling magazine station;
- guiding arrangements for mounting said magazines and for shifting said magazines around a closed loop between said magazine stations and to bring said magazines successively to said cassette handling station;
- said magazines facing said cassette handling station as they are moved;
- the number of cassette magazines being less than the number of magazine stations; and
- guide and cam follower members associated with each magazine, and a plurality of cams for engaging said members to circulate said magazines;
- whereby any selected cassette is accessed by shifting the positions of said magazines until the magazine containing the selected cassette is located at said cassette handling station.

25. A high density tape storage and access system comprising:
- a plurality of at least three tape cassette magazines;
- a framework and mechanism providing a plurality of at least four magazine stations, including at least one cassette handling magazine station;
- guiding arrangements for mounting said magazines and for shifting said magazines around a closed loop between said magazine stations and to bring said magazines successively to said cassette handling station;
- said magazines facing said cassette handling station as they are moved; and
- the number of cassette magazines being less than the number of magazine stations; and
- each said magazine being mounted on a platform and said platforms each having a depending guide and cam follower member;
- whereby any selected cassette is accessed by shifting the positions of said magazines until the magazine containing the selected cassette is located at said cassette handling station.

* * * * *